US006403889B1

United States Patent
(12) United States Patent
Mehan et al.

(10) Patent No.: US 6,403,889 B1
(45) Date of Patent: Jun. 11, 2002

(54) BI-LAYER COVERING SHEATH

(75) Inventors: Ashok K. Mehan, Union City; Rene Jairo Revueltas, East Palo Alto; Bryan Williams, San Jose; Daniel A. Chandler, Menlo Park, all of CA (US)

(73) Assignee: Tyco Electronics Corporation, Middletown, PA (US)

(*) Notice: Subject to any disclaimer, the term of this patent is extended or adjusted under 35 U.S.C. 154(b) by 0 days.

(21) Appl. No.: 09/587,088

(22) Filed: May 31, 2000

(51) Int. Cl.[7] .................................................. H01B 9/02
(52) U.S. Cl. .................................................. 174/120 R
(58) Field of Search ...................... 174/120 R, 120 SR; 138/140, 141, 145, 146

(56) References Cited

U.S. PATENT DOCUMENTS

| | | | | |
|---|---|---|---|---|
| 3,985,951 A | | 10/1976 | Harris | 174/138 F |
| 4,206,785 A | | 6/1980 | Graafmann et al. | 138/149 |
| 4,751,031 A | | 6/1988 | Baars | 264/35 |
| 4,979,799 A | * | 12/1990 | Hebrechtsmeier et al. | 385/142 |
| 5,327,513 A | * | 7/1994 | Nguyen et al. | 385/114 |
| 5,378,879 A | | 1/1995 | Monovoukas | 219/634 |
| 5,719,354 A | * | 2/1998 | Jester et al. | 174/255 |
| 5,861,578 A | * | 1/1999 | Hake et al. | 174/120 R |
| 5,932,206 A | | 8/1999 | Usui | 428/35.9 |
| 6,146,726 A | * | 11/2000 | Yoshii et al. | 428/35.9 |

FOREIGN PATENT DOCUMENTS

| | | |
|---|---|---|
| DE | 44 33 590 A1 | 3/1996 |
| EP | 0 233 516 A2 | 8/1987 |
| EP | 0 365 835 B1 | 5/1990 |
| EP | 0 417 404 B1 | 3/1991 |
| EP | 0 520 473 A1 | 12/1992 |
| EP | 0 713 763 A1 | 5/1996 |
| GB | 2 246 610 A | 2/1992 |
| JP | 53-67109 | 6/1978 |
| JP | 54-60365 | 5/1979 |
| JP | 57-60136 | 12/1982 |
| JP | 58-29218 | 6/1983 |
| JP | 4-263930 | 9/1992 |
| JP | 8-52828 | 2/1996 |
| JP | 8-90704 | 4/1996 |
| JP | 9-210291 | 8/1997 |
| JP | 10-238426 | 9/1998 |
| NL | 8000495 | 8/1981 |
| SU | 1 090 960 | 5/1984 |
| WO | WO 99/43051 | 8/1999 |

OTHER PUBLICATIONS

European Search Report for International Application No. PCT/US01/15463 dated Oct. 19, 2001.

Patent Abstract of Japan vol. 2, No. 098 (M–030), JP 53 067109 (1978).

* cited by examiner

*Primary Examiner*—Chau N. Nguyen

(57) ABSTRACT

A bi-layer covering sheath has a foamable polymeric inner layer, and a non-foamable non-heat-shrinkable polymeric outer layer surrounding and in intimate contact with the inner layer; the outer layer having a melting point that is at least 60° above the melting point of the inner layer, and the thickness and mechanical strength of the outer layer being such that the sheath retains substantially constant outer dimensions at a temperature sufficient to cause foaming of the inner layer. These sheaths are tubes for covering, generally, elongated substrates such as tubes, rods, wires, and cables, especially tubes, and caps for covering an end of such substrates.

12 Claims, 1 Drawing Sheet

10

12

14

BI-LAYER COVERING SHEATH

BACKGROUND OF THE INVENTION 1. FIELD OF THE INVENTION

This invention relates to covering sheaths, for example tubes for covering, generally, elongated substrates such as tubes, rods, wires, and cables, especially tubes, and caps for covering the end of such substrates, and methods for making and using them. 2. DESCRIPTION OF RELATED ART Harris, U.S. Pat. No. 3,985,951, discloses electrical insulator tubes and caps including a foamable inner layer and an outer layer which may be polymeric and is preferably a heat-shrinkable thermoplastic.

Rehau AG & Co., European Patent Publication No. 0,233, 516, discloses a multi-layer plastic shrink tubing for encasing substrates when heat-shrunk over them, where one layer is made of foamable material and the other is not.

Sumitomo Electric Industries, European Patent Publication No. 0 520 473, discloses a multi-layered foam heat-shrinkable tube, having a hot-melt adhesive layer as the innermost layer, and at least one foamable and one non-foamable layer outside the innermost layer.

Sumitomo Electric Industries, European Patent Publication No. 0 713 763, discloses a foamable covering tube, where the inner layer is foamable and the outer layer suppresses outward expansion of the inner layer. The outer layer may, but need not, be heat-shrinkable.

The disclosures of these and other documents referred to throughout this application are incorporated herein by reference.

It would be desirable to develop a covering sheath, for example a tube for covering, generally, an elongated substrate such as a tube, rod, wire, or cable, especially a tube, and a cap for covering the end of such a substrate, having a foamable thermoplastic polymeric inner layer, and a non-foamable non-heat-shrinkable thermoplastic polymeric outer layer surrounding and in intimate contact with the inner layer; the outer layer having a melting point that is at least 60° C. above the melting point of the inner layer, and the thickness and mechanical strength of the outer layer being such that the sheath retains substantially constant outer dimensions at a temperature sufficient to cause foaming of the inner layer.

BRIEF SUMMARY OF THE INVENTION

In a first aspect, this invention provides a bi-layer covering sheath, comprising:

(a) a foamable thermoplastic polymeric inner layer, and (b) a non-foamable non-heat-shrinkable thermoplastic polymeric outer layer surrounding and in intimate contact with the inner layer; the outer layer having a melting point that is at least 60° C. above the melting point of the inner layer, and the thickness and mechanical strength of the outer layer being such that the sheath retains substantially constant outer dimensions at a temperature sufficient to cause foaming of the inner layer.

In a second aspect, this invention provides a method of covering an elongate substrate or an end thereof, by placing around that substrate, in the elongate direction, a bi-layer covering sheath of the first aspect of this invention and heating the sheath to a temperature sufficient to cause foaming of the inner layer but not more than the melting point of the outer layer, causing the inner layer to foam, and the sheath to thereby cover the substrate or end thereof.

In a third aspect, this invention provides a method of manufacturing the bi-layer covering sheath of the first aspect of this invention.

DETAILED DESCRIPTION OF THE PREFERRED EMBODIMENTS

Figure 1:
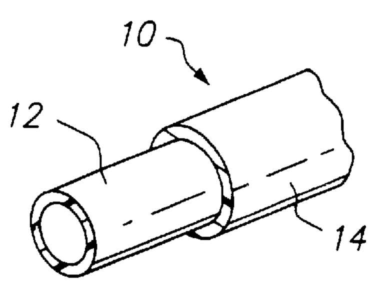
FIG. 1 is a partial perspective view of a covering sheath of this invention, with the outer layer cut back to reveal the inner layer more clearly.

Referring to the drawings, where like numerals denote like elements of the invention, FIG. 1 is a to partial perspective view of a covering sheath of this invention with the outer layer cut back to reveal the inner layer more clearly. The sheath shown generally at 10 comprises an outer layer 14 of a non-foamable, non-heat-shrinkable thermoplastic polymeric material, surrounding and in intimate contact with a foamable thermoplastic polymeric inner layer 12. The outer layer has a melting point that is at least 60° C. above the melting point of the inner layer, and the thickness and mechanical strength of the outer layer are such that the sheath retains substantially constant outer dimensions on foaming of the inner layer.

Figure 2:
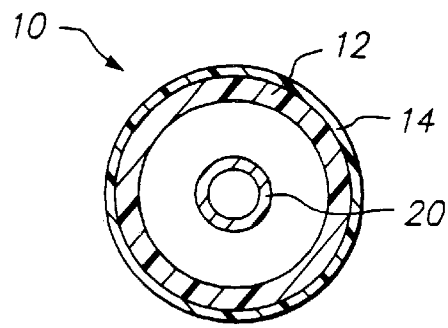
FIG. 2 is a transverse cross-sectional view of a covering sheath of this invention emplaced about a substrate.

FIG. 2 is a transverse cross-sectional view of a covering sheath of this invention emplaced about a substrate. The covering sheath 10 surrounds the substrate 20 completely. Although in these figures both the substrate and the covering sheath are shown as being of circular cross-section (apart from the crimped end caps shown in FIGS. 6 and 7), it is within the scope of this invention that the sheath may have a non-circular cross-section if desired, especially if it is to be used to cover a substrate that is of non-circular cross-section. However, since the presently contemplated substrates of this invention (tubes, rods, wires, and cables, especially tubes) generally have a circular cross-section, and since it is somewhat easier to make dies for extrusion of circular cross-sections, the covering sheaths of this invention will typically be of circular cross-section.

Figure 3:
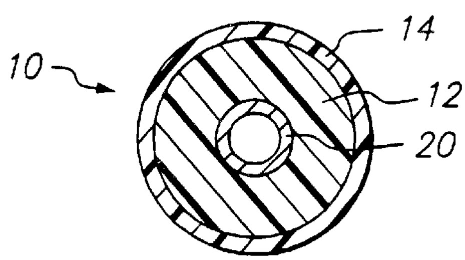
FIG. 3 is a transverse cross-sectional view showing the sheath and substrate of FIG. 2 after foaming.

FIG. 3 is a transverse cross-sectional view showing the sheath and substrate of FIG. 2 after foaming. When the sheath is foamed, the inner layer foams to fill the gap between the outside of the substrate and the inside of the outer layer, while the outer layer neither foams nor substantially changes shape during the foaming process. In particular, the outer layer is non-heat-shrinkable. The ratio of the diameter of the inside of the inner layer of the sheath to the outside diameter of the substrate, before foaming, when the space between the outside of the substrate and the inside of the outer layer are completely filled after foaming, is referred to as the filling ratio. The ability of a particular covering sheath to meet the filling ratio need for a given substrate will be determined by the thickness of the inner layer (since this, in effect, defines the volume of foamable material available) and the expansion ratio of the foamable material of the inner layer (the ratio between the volume of a piece of the material of the inner layer after unconstrained foaming to the volume of that same piece of material before foaming, usually expressed as a percentage). Because the expansion ratios of suitable foamable material for the inner layer may be as high as 1000% or more, though more typically they are between about 400% and about 600%, and can be readily determined by test, a person of ordinary skill in the art will be able to determine a suitable inner layer thickness to achieve a desired foaming ratio, and therefore be able without undue experimentation to determine a suitable covering sheath for a given substrate. In fact, as can be seen from the Examples later, quite a wide range of substrate diameters can be accommodated by a single covering sheath, so it should not be necessary to manufacture a great variety of covering sheaths to accommodate common substrates; though different materials for the inner and outer layers may be used, as discussed later, to achieve certain properties, such as stiffness, chemical resistance, temperature resistance, and the like required or desired for a given application.

Figure 4:
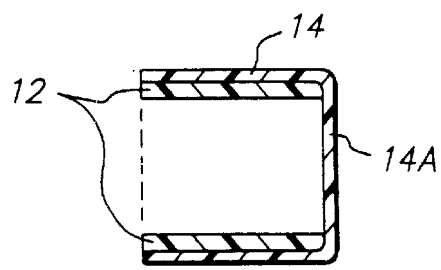
FIG. 4 is a longitudinal cross-section of a first covering cap of this invention.

FIG. 4 is a longitudinal cross-section of a first covering cap of this invention, in which the cap has a closed end 14A comprising only the material of outer layer 14, such as if the cap had been molded of the material of outer layer 14 and a tubular insert of inner layer material had been inserted or molded therein. Such a cap may also be formed by any other suitable process, for example by first preparing a tubular inner layer, such as by molding, and then molding the outer layer cap around it. While the cap has been shown as having a uniform transverse dimension along its length, this is not required, and the transverse dimension may taper from the open end of the cap to the closed end if desired to assist in the molding process.

Figure 5:
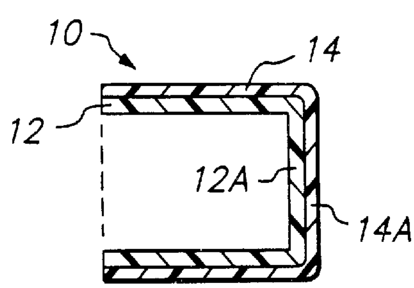
FIG. 5 is a longitudinal cross-section of a second covering cap of this invention.

FIG. 5 is a longitudinal cross-section of a second covering cap of this invention, in which the cap has a closed end 12A, 14A comprising the material of both the inner layer 12 and the outer layer 14, such as if the inner layer had been molded in the form of the cap and the outer layer molded around it. Just as for the cap of FIG. 4, such a cap may have a tapering transverse dimension, if desired, or a uniform transverse dimension as shown.

Figure 6:
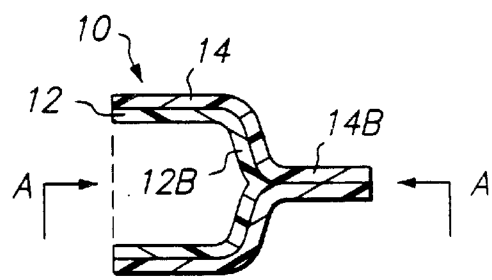
FIG. 6 is a longitudinal cross-section of a third covering cap of this invention.

FIG. 6 is a longitudinal cross-section of a third covering cap of this invention, in which the cap has a closed end 12B, 14B comprising the material of both the inner layer 12 and the outer layer 14. In this embodiment, the cap has been formed from a tube of this invention by a crimping and heat-sealing process in which an end of the tube is crimped closed in a die heated to a sufficient temperature to soften the outer layer and cause it to seal to itself, as discussed later.

Figure 7:
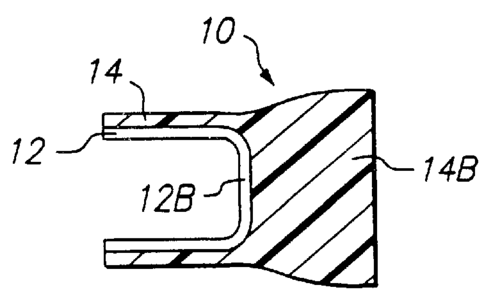
FIG. 7 is a longitudinal cross-section along line A—A of the third covering cap of this invention.

FIG. 7 is a longitudinal cross-section along line A—A of the third covering cap of this invention, showing the flattened closed end 12B, 14B of the cap. In FIGS. 6 and 7, the inner layer 12 is shown as if it had flowed to form the closed end 12B; but it is also within the scope of this invention for the outer layer to have protruded beyond the inner layer before the crimping process, so that the inner layer forms only a tubular section rather like that of the cap of FIG. 4.

Figure 8:
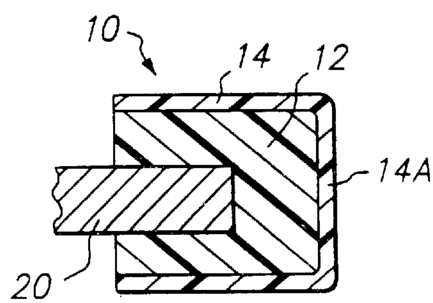
FIG. 8 is a longitudinal cross-section of the first covering cap of this invention emplaced and shrunk about a substrate.

FIG. 8 is a longitudinal cross-section of the first covering cap of this invention emplaced and shrunk about a substrate. Here the cap has been emplaced around the substrate so that an end of the substrate lies within the cap, and the cap heated to such an extent that the inner layer 12 has foamed around the substrate and the outer layer 14 surrounds and is in intimate contact with the inner layer 12.

Composition of the Inner Layer

Suitable compositions for the inner layer of the covering sheath of this invention will be foamable polymer compositions having a foaming temperature appropriate to the temperature range of intended application, for example a foaming temperature within the range of temperatures to be encountered in paint ovens, a foaming temperature within the range achieved by conventional heat guns or torches, and the like. Such compositions will contain a base polymer and a blowing agent to cause foaming of the polymer. They will typically also contain fillers, antioxidants, flame retardants, and/or other stabilizers such as are conventional in polymeric articles, and may contain pigments, plasticizers, adhesion promoters, activators for the blowing agents, and the like.

The inner layer may, and preferably will, contain a chemical crosslinking agent to stabilize the resulting foamed polymer, and may also contain a tackifier to maximize adhesion of the inner layer to a substrate on foaming. The inner layer may be uncrosslinked before foaming, where it is totally free of crosslinking; or it may be lightly crosslinked, where it has such a low degree of crosslinking that it substantially retains the foaming and adhesive characteristics of an uncrosslinked polymer (though it may display slightly reduced foaming, a more uniform cell size of the resulting foam, and a slightly reduced adhesion, and these characteristics may make a lightly crosslinked inner layer desirable). Desirably, the foamable layer becomes substantially crosslinked on foaming, as discussed further later in the application, as this provides additional stability to the foam, but it is within the scope of the invention that the foamable layer may be uncrosslinked or only lightly crosslinked (as defined immediately above) even after foaming.

Suitable base polymers may include a wide range of polymers, typically chosen for a particular application so that the resulting inner layer will foam at a convenient temperature for covering of a substrate to be covered and will be stable under intended use conditions. A suitable base polymer or mixture of polymers will thus have a melting point below the desired temperature of foaming, for example at a temperature at least 30° C., preferably about 40° C. or more below the desired foaming temperature, in the absence of crosslinking. The melt flow index, MFI, as measured by ASTM D-1238-95, of the polymer or mixture of polymers will desirably be from 0.5 to 10 g/min, preferably from 1 to 5 g/min, and in any event will desirably be chosen to give an appropriate degree of expansion of the resulting foamable layer during foaming.

Suitable polymers thus include olefinic polymers such as very low density polyethylene, low density polyethylene, medium density polyethylene, high density polyethylene, polyethylenes or ethylene copolymers prepared by metallocene polymerization, such as Exact [Exxon] and Engage [Dow], ethylene copolymers such as ethylene-vinyl acetate copolymer, ethylene/methacrylic acid copolymer, ethylene/acrylic acid copolymer, ethylene/ethyl acrylate copolymer, ethylene/butyl acrylate copolymer, ionomers, such as Surlyn [duPont] and Iotek [Exxon], ethylene terpolymers such as ethylene/vinyl acetate/methacrylic acid copolymer, elastomers such as ethylene-propylene rubber, EPDM, nitrile rubbers, butyl rubbers, chloroprene, chloropolyethylene, polyacrylate elastomers, chlorosulfonated polyethylene, thermoplastic elastomers, and fluoropolymers such as polyvinylidene fluoride, ethylene/tetrafluoroethylene copolymer, fluorinated ethylene/propylene copolymer, tetrafluoroethylene/vinylidene fluoride/hexafluoropropylene terpolymer (Viton), poly(chloro-trifluoroethylene), ethylene/chlorotrifluoroethylene copolymer, etc., and compatible mixtures of any two or more of the above.

The temperature range at which the inner layer is foamed is typically between 115° C. and 275° C., such as is found in paint ovens and readily achievable by conventional ovens, heat guns or torches. More typically for olefinic polymers, the foaming temperature range is between 150° C. and 180° C., with possible short excursions above 180° C. Typical baking cycles in paint ovens are 10 minutes to 60 minutes, more typically about 20 minutes, in duration. Much shorter foaming cycles can be used for thinner wall products.

Thus, for example, a suitable polymer or mixture of polymers for use in the inner layer of a covering sheath for use in an industry where the sheath will be foamed by passage through an oven such as an automobile or appliance paint oven, may have a melting point of about 100° C. in the absence of crosslinking. Such polymers may include ethylene-vinyl acetate copolymer (EVA), ethylene-methyl acrylate copolymer (EMA), and the like, optionally admixed with each other or with such polymers as low density polyethylene and/or ionomers. An exemplary polymer is EVA having a vinyl acetate (VA) content between 5% and 45%, especially between 15 and 35%, particularly between 20% and 30%.

However, for higher temperature applications and applications in which flame and chemical resistance is desired, the fluoropolymers, including fluoropolymer thermoplastic elastomers, are especially suitable.

Suitable fillers for the composition of the inner layer include inorganic fillers such as zinc oxide (Kadox), barium sulfate (Huberbrite), calcium carbonate, magnesium hydroxide, alumina trihydrate, and the like; at a concentration up to about 40 parts per 100 parts of the base polymer.

The blowing agent is chosen so as to effect foaming of the inner layer at an elevated temperature normally present during the manufacture of the product containing the substrate to be covered. Suitable blowing agents will include from 1 to 15 parts per 100 parts of base polymer of an azodicarbonamide or benzenesulfonyl hydrazide. Suitable azodicarbonamide blowing agents include Celogen® AZ130 or 3990; and suitable modified azodicarbonamide agents include Celogen® 754 or 765, all from Uniroyal Chemical. Suitable benzenesulfonyl hydrazide blowing agents include p,p'-oxybis(benzenesulfonyl hydrazide), sold as Celogen® TO, and p-toluenesulfonyl hydrazide, sold as Celogen® TSH, both also from Uniroyal. The blowing agent may also be made up of a combination of agents depending on the degree of expansion desired for a particular application; and may also include a blowing agent activator such as diethylene glycol, urea, dinitrosopentamethylenetetramine (DNPT), and the like. Certain fillers, such as zinc oxide, may also act as activators for the blowing agent. The amount of activator added will depend on the choice of blowing agent and the amount of expansion required.

Flame retardants may also be present, of such kinds and at such concentrations as will provide flame retardancy for the inner layer. These may include halogenated flame retardants such as the polybrominated aromatics (e.g. decabromobiphenyl), and the like, for example in combination with inorganic materials such as antimony trioxide; or may include non-halogenated flame retardants, such as the magnesium hydroxide and alumina trihydrate previously mentioned as fillers.

The chemical crosslinking agent is preferably a free radical crosslinking agent compatible with the base polymer of the foamable layer. Preferred chemical crosslinking agents are peroxides, such as bis(t-butylperoxy) diisopropylbenzene, 1,1-di-t-butylperoxy-3,3,5-trimethylcyclohexane, 4,4-di-t-butylperoxy n-butyl valerate (Trigonox), dicumyl peroxide (Dicup), and the like. In most cases, the chemical crosslinking agent is provided at 1 to 5 parts per 100 parts of base polymer.

Suitable radiation crosslinking promoters may be added, if it is desired that the inner layer should be crosslinked, and may be chosen from among those conventionally used to promote the crosslinking of polymers, such as triallyl cyanurate (TAC), triallyl isocyanurate (TAIC), triallyl trimellitate, triallyl trimesate, tetraallyl pyromellitate, the diallyl ester of 1,1, 3-trimethyl-5-carboxy-3-(4-carboxyphenyl)-indane, trimethylolpropane trimellitate (TMPTM, Sartomer 350), pentaerythritol trimethacrylate, tri(2-acryloxyethyl) isocyanurate, tri(2-methacryloxyethyl) trimellitate, and the like, and combinations thereof. These will be added, and the covering sheath irradiated, if at all, only to such an extent that the inner layer is only lightly crosslinked and the foaming characteristics of the inner layer are not adversely affected, as discussed previously.

The blowing agent and the chemical crosslinking agent will be chosen so that the chemical crosslinking agent has an activation temperature about that of the blowing agent. For example, it may have an activation temperature slightly below that of the blowing agent, so that the foam maintains stability during its inward expansion; but desirably the kinetics of the crosslinking and foaming reactions are such that the foamable layer expands and foams inwardly on heating, and adheres to the substrate, before the resulting foam is completely crosslinked by action of the chemical crosslinking agent.

Desirably, the activation temperature of the blowing agent will be chosen so that the blowing agent is not easily accidentally activated (such as by mixing at a temperature above the optimal mixing temperature) but is only activated when it encounters temperatures in which it is desired that the inner layer should foam.

The tackifier, if present, will be chosen to enhance the tackiness of the inside surface of the inner layer, i.e. the surface of the inner layer that will come into contact with the substrate, on foaming; and also if necessary to enhance the adhesion of the inner layer to the outer layer; but not such that the inner surface exhibits tackiness after formation of the covering sheath and before foaming, since it is generally desirable that the inner surface of the covering sheath should be dry and non-tacky during initial placement of the covering sheath over the substrate. Desirably, to enhance the adhesive qualities of the base polymer of the inner layer at the temperature of foaming, the tackifier will have a relatively low molecular weight, no significant crystallinity, a ring-and-ball softening point above at least 50° C. (and preferably higher, near the softening point of the base polymer), and will be compatible with the base polymer and other polymers present. The tackifier may be present in up to 30 parts per 100 parts of base polymer. Suitable tackifiers include novolak resins, partially polymerized rosins, tall oil rosin esters, low molecular weight aromatic thermoplastic resins, Picco® and Piccotac® resins from Hercules Chemical, and the like.

Antioxidants, adhesion promoters, plasticizers, pigments, and the like may also be employed in conventional amounts.

The inner layer may also contain a ferromagnetic filler such as ferrites or metal flakes or powders, or other particulate absorptive material, so that the inner layer will act as an inductor and be capable of being heated by electromagnetic energy (induction heating), and/or so that the covering sheath provides electromagnetic shielding for the covered substrate. Suitable such fillers include the nickel/aluminum powders sold as NiAl by Inco Ltd., and the like. An absorptive filler may be present in from 10 to 70 parts, especially from 20 to 50 parts, by weight per hundred parts by weight of base polymer. If an absorptive filler is present, the content of other fillers will be reduced, as the absorptive filler will itself provide filling and stiffening characteristics to the composition of the inner layer. The use of absorptive fillers to enable inductive heating of polymer compositions is disclosed in Monovoukas, U.S. Pat. No. 5,378,879, entitled "Induction heating of loaded materials". The selection of the particular absorptive filler, and its content in the composition of the inner layer, to achieve an inner layer that is heatable to achieve adequate foaming by the induction heating unit of choice, will be within the skill of a person ordinary skill in the art without undue experimentation having regard to that skill and this disclosure.

It is also within the contemplation of this invention that the inner layer should be coated on its inner surface with an a separate adhesive formulation chosen to provide enhanced bonding of the inner surface of the inner layer on foaming, either in addition to or as an alternative to the use of a tackifier in the polymer mixture of the inner layer itself. Suitable such adhesive formulations will be hot-melt adhesives such as those based on ionomers or polyamides, or on low-melting ethylene-vinyl acetate or ethylene-ethyl acetate polymers, and the like. Desirably, such a hot-melt adhesive layer will have a melting point below the foaming temperature of the inner layer, so that it will be melted and softened while the inner layer is foaming toward the substrate to be covered.

Composition of the Outer Layer Suitable compositions for the outer layer of the covering sheath of this invention will be non-foamable polymer compositions having a melting point appropriate to the temperature range of intended application and compatible with the foamable polymer composition of the inner layer. Such compositions will contain a base polymer and will typically also contain fillers, antioxidants, flame retardants, and/or other stabilizers such as are conventional in polymeric articles, and may contain pigments, plasticizers, and the like.

The outer layer may, if desired, contain a radiation crosslinking agent to enable crosslinking of the outer layer without heating if the additional strength afforded by crosslinking is desired, or it may be uncrosslinked.

Suitable base polymers may include a wide range of polymers, typically chosen for a particular application so that the resulting outer layer will be stable and mechanically sufficiently strong at the conditions for covering of a substrate to be covered and will be stable under intended use conditions. A suitable base polymer or mixture of polymers will thus have a melting point at least 60° C., preferably at least 80° C., for example at least 100° C. above the melting point of the polymer of the inner layer; and therefore typically of at least 160° C., preferably at least 180° C., more preferably at least 200° C., for the ethylene/vinyl acetate copolymer inner layers previously mentioned. For inner layers having higher melting base polymers such as ethylene/methacrylic acid or the fluoropolymers, the melting point of the outer layer base polymers will be correspondingly higher. There is no objection to the melting point of the base polymer of the outer layer being greatly in excess of the melting point of the inner layer, i.e. more than 100° C. higher; but it will be recognized that such high melting polymers tend to be more expensive than lower melting polymers and will therefore only be commercially attractive where their particular properties are desired.

In addition to the suitable melting point differential mentioned in the previous paragraph, the base polymers for the outer layer may also be chosen for one or more of chemical resistance (e.g. resistance to solvents), mechanical strength and stiffness, and resistance to abrasion, cut-through, pinch, and/or impact since it is the outer layer that provides these features for the covering sheath of this invention.

Suitable polymers thus include aliphatic polyamides such as the nylons (for example nylon 6, nylon 6/6, nylon 4/6, and nylon 12), polyesters such as polyethylene terephthalate and polybutylene terephthalate, polycarbonates, thermoplastic aromatic polyamides, polyether-amides, polyimides such as Aurum™ (MTC America), polyether-imides, and the like, polyether-ketones (PEK),polyether-ether-ketones (PEEK), polyether-ketone-ether-ketone-ketones (PEKEKK), and similar high temperature thermoplastic aromatic polyketone polymers, and fluoropolymers such as ethylene/tetrafluoroethylene copolymer, poly(chlorotrifluoroethylene), ethylene/chlorotrifluoroethylene copolymer, fluorinated ethylene/propylene copolymer, perfluoroacrylate polymers and copolymers, and the like, and compatible mixtures of any two or more of the above.

Suitable polymer pairs for the inner and outer layer of the covering sheath of this invention thus include, with the inner layer polymer given first, ethylene/vinyl acetate:nylon 6, ethylene/methacrylic acid:polyether-imide, Viton:ethylene/tetrafluoroethylene, etc.

Suitable fillers for the composition of the inner layer include fibrous or particulate reinforcing inorganic fillers such as glass fiber and the fillers discussed previously for the inner layer; at a concentration up to about 40 parts per 100 parts of the base polymer.

Flame retardants, of the kind discussed previously for the inner layer, may also be present, of such kinds and at such concentrations as will provide flame retardancy for the outer layer.

Antioxidants, pigments, and the like may also be employed in conventional amounts.

Suitable radiation crosslinking promoters may be added, if it is desired that the outer layer should be crosslinked, and may be chosen from among those discussed previously with respect to the composition of the inner layer.

The outer layer may also contain a processing aid such as powdered alumina or powdered tetrafluoroethylene at low levels, particularly for the more difficult to process PEK, PEEK, aromatic polyamide and polyimide base polymers. Compositions containing nylons or other hydrolyzable polymers may also contain a poly(carbodiimide) to prevent hydrolytic damage to the polymer during processing.

Also, the outer layer may contain an absorptive filler, such as the absorptive filler discussed previously for the inner layer, to provide electromagnetic shielding.

The Covering Sheath, its Manufacture and Use

The covering sheaths of this invention are prepared by first preparing the inner layer and outer layer compositions by methods conventional in the art of polymer blending, such as by mixing in a high shear mixer such as a Banbury or Brabender type mixer.

For the inner layer, care must be taken to ensure that the temperature of the blend does not rise to such an extent that the chemical crosslinking agent or blowing agent are activated. For the inner layer, typically, the base polymer, other polymers/tackifier (if present), and antioxidant are added first, and blended to homogeneity. The filler, adhesion promoter, pigments (if present) may be mixed with the base polymer, or may be added after the base polymer has been softened by mixing. These first mixing stages are not particularly temperature-sensitive. Once all ingredients other than the blowing and crosslinking agents have been added and fully blended, however, temperature control becomes important as these last agents are added. Accordingly, the mixer is cooled so that the temperature of the composition does not exceed remains safely below the activation temperatures of the blowing and chemical crosslinking agents; the blowing agent(s), accelerator(s), crosslinking agents, and any plasticizers are added, and the resulting composition is subjected to high shear mixing under controlled temperature conditions until the composition is homogeneous. The composition may then be cooled, for example by processing through a two-roll mill with cooled rollers. The resulting bulk composition may then be pelletized or otherwise prepared for use as an extrusion starting material.

For the outer layer, similar techniques may be used, but the need for care to avoid activation of the blowing agent and the chemical crosslinking agent is absent, since such agents are not used in the outer layer.

The covering sheaths of this invention may be prepared by any suitable process. When the covering sheath is a tube, or is initially formed as a tube, a particularly suitable method is a two-pass co-extrusion technique, of the type well-known in the art, in which the inner layer is first extruded at a comparatively low temperature (e.g. about 105° C. for an ethylene/vinyl acetate base polymer) to prevent premature foaming or crosslinking of the inner layer during extrusion; and the outer layer is then extruded over the already formed inner layer, typically at the lowest temperature suitable for the extrusion of the composition of the outer layer to minimize the risk of overheating the inner layer and causing premature foaming or crosslinking.

When the covering sheath is a cap and is not formed from a tube, the inner layer will generally first be formed into the desired tubular (if the inner layer is only to cover the side wall of the cap) or cap (if the inner layer is to cover both the side wall and end wall of the cap) shape, and the outer layer will then be molded onto the inner layer, thereby forming the cap.

When the covering sheath is a cap, it may also be conveniently formed from a tube by a process in which one end of the tube is crimped closed in a die heated to a sufficient temperature to soften the outer layer and cause it to seal to itself, just as for the end of a toothpaste tube or the like, with the inner layer either being absent in the region of the tube that is to become the crimped end of the cap, or the inner layer being forced away from the crimped region by the inner layer's flowing under the heat and pressure of the crimping and sealing process.

A person of ordinary skill in the art of polymer compounding and processing will have no difficulty, having regard to that knowledge and this disclosure, in determining suitable conditions for preparing covering sheaths of this invention.

The covering sheaths may be irradiated, if desired, to crosslink the outer layer and/or to lightly crosslink the inner layer. Suitable irradiation conditions include the use of up to about 3–4 Mrad of 3 MeV electrons.

The covering sheaths are then used by emplacement over the substrate or end to be covered and heating to a sufficient temperature and for a sufficient time to cause foaming and curing of the inner layer but not sufficient to cause such softening of the outer layer that substantial change in outer dimension of the sheath occurs. The sheath, emplaced on the substrate, will be heated to a temperature that is above the foaming temperature of the inner layer but below the melting point of the outer layer;

typically, the temperature will be at least 20° C., preferably at least 40° C., especially at least 60° C. the melting point of the outer layer. A desirable method of heating is in an oven: although it will be possible to heat the covering sheaths of this invention by a torch or hot air gun, care will be needed to avoid overheating the outer layer while still supplying enough heat to ensure proper foaming and curing of the inner layer. If the inner layer contains an absorptive filler, it will be possible to heat the covering sheath by the application of high frequency electromagnetic energy (induction heating) without the application of external heat. Under these conditions, the outer layer will be heated only by conduction from the inner layer. A person of ordinary skill in the art will have no difficulty, having regard to that skill and this disclosure, in determining suitable heating conditions.

Suitable substrates to be covered by the covering sheaths of this invention include elongated substrates such as tubes, rods, wires, and cables, and the ends thereof. The covering sheaths of this invention are particularly attractive for covering tubes, where the foamed inner layer may provide thermal insulation and, together with the outer layer, may provide chemical and corrosion resistance, and mechanical protection, for the tubes. Especially, they may help prevent crushing of thin-walled tubes and allow bending of a covered tube with reduced risk of "folding" of the tube at the bend. When the covering sheaths are made of fluoropolymers such as the Viton:ethylene-tetrafluoroethylene pair mentioned previously, they may provide excellent resistance to adverse conditions including high temperatures, corrosive external conditions, and mechanical wear. When the covering sheaths are made with an extremely high melting point outer layer, such as a layer of PEK, PEEK, PEKEKK, or other polyketone polymers, or an aromatic polyamide, polyether-amide, and the like, the sheaths may provide an effective substitute for heat-shrinkable sheaths (which would be difficult if not impossible to manufacture due to the difficult processability of these high temperature polymers). Thus the covering sheaths of this invention are particularly attractive when the melting point of the outer layer is more than 270° C., especially more than 300° C.

EXAMPLES

The following non-limiting preparations and examples illustrate the invention.

Preparation 1. Inner Layer Compositions

Four representative inner layer compositions, based on ethylene/vinyl acetate copolymers, were prepared from the following materials:

| | Formulation, parts by weight | | | | |
|---|---|---|---|---|---|
| Ingredient | A | B | C | D | E |
| Elvax 760 (EVA copolymer, 9% VA, MI 2, du Pont) | 78.44 | 80.33 | 64.34 | 64.30 | 32.15 |
| Irganox 1076 (antioxidant, Ciba-Geigy) | 0.78 | 0.80 | 0.64 | 0.64 | 0.32 |
| Kadox 911 (ZnO, Marman/Keystone) | 3.92 | 4.02 | 3.22 | 3.22 | 1.61 |
| Omya-BSH ($CaCO_3$, Degussa) | 0 | 0 | 19.27 | 19.28 | 9.64 |
| Raven C Ultra Beads (carbon black, Columbian) | 0.39 | 0.40 | 0.32 | 0.32 | 0.16 |

-continued

| Ingredient | Formulation, parts by weight A | B | C | D | E |
|---|---|---|---|---|---|
| Piccotac 95 (tackifier, Hercules) | 7.84 | 6.02 | 4.82 | 4.82 | 2.40 |
| Vulcup 40KE (peroxide crosslinking agent, Hercules) | 3.14 | 3.21 | 2.57 | 2.58 | 1.29 |
| Celogen OT-72-DG (blowing agent, Uniroyal) | 3.14 | 3.21 | 2.89 | 2.90 | 1.45 |
| SR 350 DD (crosslinking promoter, Sartomer) | 2.35 | 2.01 | 1.93 | 1.94 | 0.97 |
| Elvax 4260 (EVA copolymer, du Pont) | 0 | 0 | 0 | | 27.39 |
| Nevpene 9500 (tackifier, Hercules) | 0 | 0 | 0 | | 1.48 |
| Santonox TBMC (antioxidant, Sartomer) | 0 | 0 | 0 | | 0.59 |
| NiAl 3.00 (nickel/aluminum powder, Inco) | 0 | 0 | 0 | | 20.55 |

For Compositions A through D, the ingredients were blended together using a Banbury type mixing line where the materials were mixed, for about 3–4 minutes per batch, and pelletized in-line.

Composition E is a 1:1 blend of pellets of Composition D and pellets of a nickel/aluminum-filled composition (the last four ingredients of Composition E). The nickel/aluminum-filled composition was made on a ZSE 34 mm twin screw extruder where the ingredients were metered using weigh feeders and the composition processed at about 11.5 Kg/hour. Composition D and the nickel/aluminum-filled composition were dry blended in a 1:1 ratio to provide Composition E.

Composition A provides a relatively flexible inner layer; Composition B is slightly more rigid; Compositions C and E are substantially more rigid because of their higher filler loading (the $CaCO_3$). Composition E is also relatively rigid because of the $CaCO_3$ and metal fillers. While Compositions A through D each require the external application of heat to cause foaming of the composition, Composition E is designed to be foamable on the application of electromagnetic energy (induction heating) because of its nickel/aluminum metallic filler content.

The melting points of the two principal polymers (Elvax 760 and Elvax 4260) of the compositions are each near 100° C., as measured by differential scanning calorimetry; and the foaming temperatures of the compositions are about 140–160° C., based on the activation temperature of the blowing agent and the presence of zinc oxide, which acts as an activator for the blowing agent.

Preparation 2. Outer Layer Compositions

Two representative outer layer compositions were commercially available compounded polymers: (F) a nylon 6 from Allied Signal (Grade HS2350, mp 215° C.), and (G) a polyether-ether-ketone (PEEK) from Victrex (PEEK 450, mp 343° C.).

Preparation 3. Manufacture of Covering Tubes

Four representative covering tubes were prepared in a two-pass process as follows:

(1) The inner layer was extruded on a single screw extruder with a barrel inside diameter of 50 mm and an L/D ratio of 24:1, using a common 3:1 compression ratio general purpose polyethylene screw and an adjustable eccentricity crosshead. The extrusion temperatures were maintained at about 105° C. to prevent premature foaming or crosslinking of the inner layer during extrusion. The inner diameters of the inner layers were between 10.3 mm and 15.4 mm, and the inner layer thicknesses were between 0.75 mm and 1.5 mm, as described below.

(2) The outer layer was then extruded over the inner layer using a similar extrusion apparatus with a 38 mm barrel. The extrusion temperatures were maintained at about 250° C. for the nylon-based outer layer and 370–390° C. for the PEEK-based outer layer. The outer layer thicknesses were between 125 $\mu$m and 220 $\mu$m, as described below.

Samples of three of these covering tubes were irradiated with 3–4 Mrad of 3 MeV electrons to crosslink the inner layer, as described below.

Samples of these covering tubes were then emplaced over thin-wall aluminum tubing having outer diameters between 3.2 mm and 12.7 mm, and shrunk by either external heating (circulating air oven at about 160° C.) for tubes comprising Compositions A through D or induction heating (using an Ameritherm Nova 3 high frequency generator with a 76 mm diameter single coil, for 30 seconds at 200 V, 12 A) for tubes containing Composition E. The results are described below.

Example 1

Covering Tube 1

Materials: Inner layer, Composition A; Outer layer, Composition F

Dimensions: Inner diameter, 10.3 mm; Inner layer thickness, 0.75 mm; Outer layer thickness, 190 $\mu$m.

Samples of Covering Tube 1, prepared to the dimensions described above by the method of Preparation 3 using the inner layer and outer layer compositions described, were foamed over aluminum tubular substrates of outer diameter 3.2 mm, 6.4 mm, and 7.9 mm, giving filling ratios (defined as the inner diameter of the covering tube divided by the outer diameter of the substrate) of 3.24, 1.62, and 1.31, respectively. The covering tube foamed well over all three substrates, and the covered substrates could be bent without collapsing the aluminum tube, with the bend radius depending on the substrate. Covering Tube 1 provides good thermal protection and some mechanical protection to the substrate.

Similar samples of Covering Tube 1 that had been irradiated as described above were also shrunk over the same substrates, with similar results. A comparison between the unirradiated and irradiated covering tubes shows that the unirradiated inner layers display somewhat greater foaming, and somewhat better adhesion to the substrate; but that the irradiated inner layers show more controlled foaming.

Example 2

Covering Tube 2

Materials: Inner layer, Composition B; Outer layer, Composition F

Dimensions: Inner diameter, 15.4 mm; Inner layer thickness, 1.5 mm; Outer layer thickness, 222 $\mu$m.

Samples of Covering Tube 2, prepared to the dimensions described above by the method of Preparation 3 using the inner layer and outer layer compositions described, were foamed over aluminum tube substrates of outer diameter 6.4 mm, 7.9 mm, 9.5 mm, and 12.7 mm, giving filling ratios of 2.42, 1.95, 1.61, and 1.21, respectively. The covering tube foamed well over all four substrates, and the covered substrates could be bent without collapsing the aluminum tube, with the bend radius depending on the substrate. Covering Tube 2 provides good thermal protection and better mechanical protection to the substrate than Covering Tube 1, because of the greater rigidity of the Composition B of the inner layer.

Similar samples of Covering Tube 2 that had been irradiated as described above were also foamed over the same substrates, with similar results, and similar observations to those made for Covering Tube 1.

Example 3

Covering Tube 3

Materials: Inner layer, Composition C; Outer layer, Composition G

Dimensions: Inner diameter, 10.4 mm; Inner layer thickness, 0.75 mm; Outer layer thickness, 125 μm.

Samples of Covering Tube 3, prepared to the dimensions described above by the method of Preparation 3 using the inner layer and outer layer compositions described, were foamed over aluminum tube substrates of outer diameter 6.4 mm and 7.9 mm, giving filling ratios of 1.64 and 1.32, respectively. The covering tube foamed well over both substrates, and the covered substrates could be bent without collapsing the aluminum tube, with the bend radius depending on the substrate. Covering Tube 3 provides good thermal protection and better mechanical protection to the substrate than Covering Tube 2, because of the greater rigidity of the Composition C of the inner layer and the greater rigidity of the Composition G of the outer layer.

Example 4

Covering Tube 4

Materials: Inner layer, Composition D; Outer layer, Composition F

Dimensions: Inner diameter, 15.6 mm; Inner layer thickness, 0.75 mm; Outer layer thickness, 229 μm.

Samples of Covering Tube 4, prepared to the dimensions described above by the method of Preparation 3 using the inner layer and outer layer compositions described, were foamed over aluminum tube substrates of outer diameter 6.4 mm, 7.9 mm, and 9.5 mm, giving filling ratios of 2.46, 1.98, and 1.64, respectively. The covering tube foamed well over both substrates, and the covered substrates could be bent without collapsing the aluminum tube, with the bend radius depending on the substrate. Covering Tube 4 provides good thermal protection and better mechanical protection to the substrate than Covering Tube 2, because of the greater rigidity of the Composition D of the inner layer.

Similar samples of Covering Tube 4 that had been irradiated as described above were also foamed over the same substrates, with similar results, and similar observations to those made for Covering Tube 1.

Example 5

Covering Tube 5

Materials: Inner layer, Composition E; Outer layer, Composition F

Dimensions: Inner diameter, 13.2 mm; Inner layer thickness, 1.15 mm; Outer layer thickness, 216 μm.

A sample of Covering Tube 5, prepared to the dimensions described above by the method of Preparation 3 using the inner layer and outer layer compositions described, was foamed over an aluminum tube substrate of outer diameter 9.5 mm, giving a filling ratio of 1.39. The covering tube foamed well over the substrate, and the covered substrate could be bent without collapsing the aluminum tube. Covering Tube 5 provides good thermal protection and good mechanical protection to the substrate because of the high rigidity of Composition E of the inner layer and of Composition F of the outer layer. Because the heating of the inner layer was provided by induction heating rather than external heating, the jacket remained relatively cool during the foaming process. It was also observed that foaming took less time than for Covering Tubes 1 through 4, and this was attributed to the direct heating of the inner layer rather than heating by conduction through the outer layer.

While this invention has been described in conjunction with specific embodiments and examples, it will be apparent to a person of ordinary skill in the art, having regard to this disclosure, that equivalents of the specifically disclosed materials and techniques will also be applicable to this invention; and such equivalents are intended to be included within the following claims.

What is claimed is:

1. A bi-layer covering sheath, comprising:

(a) a foamable thermoplastic polymeric inner layer, and (b) a non-foamable non-heat-shrinkable thermoplastic polymeric outer layer surrounding and in intimate contact with the inner layer;

the outer layer having a melting point that is at least 60° C. above the melting point of the inner layer, and the thickness and mechanical strength of the outer layer being such that the sheath retains substantially constant outer dimensions at a temperature sufficient to cause foaming of the inner layer.

2. The sheath of claim 1 where the outer layer has a melting point that is at least 80° C. above the melting point of the inner layer.

3. The sheath of claim 2 where the outer layer has a melting point that is at least 100° C. above the melting point of the inner layer.

4. The sheath of claim 1 having a circular cross-section.

5. The sheath of claim 1 having a non-circular cross-section.

6. The sheath of claim 1 that is a tube.

7. The sheath of claim 1 that is a cap.

8. The sheath of claim 1 where the outer layer is crosslinked.

9. The sheath of claim 1 where the e outer layer is non-crosslinked.

10. The sheath of claim 1 where the inner layer comprises an ethylene/vinyl acetate copolymer and the outer layer comprises an aliphatic polyarnide.

11. The sheath of claim 1 where the inner layer comprises a tetrafluoroethylene/vinylidene fluoride/-hexafluoropropylene block terpolymer, and the outer layer comprises an ethylene/tetrafluoroethylene copolymer.

12. The sheath of claim 1 where the inner layer comprises an ethylene/methacrylic acid copolymer and the outer layer comprises a polyetherimide.

* * * * *